United States Patent [19]

Sugama et al.

[11] Patent Number: 4,540,726
[45] Date of Patent: Sep. 10, 1985

[54] ELECTROPOSITIVE BIVALENT METALLIC ION UNSATURATED POLYESTER COMPLEXED POLYMER CONCRETE

[75] Inventors: Toshifumi Sugama, Mastic Beach; Lawrence E. Kukacka, Port Jefferson; William H. Horn, Brookhaven, all of N.Y.

[73] Assignee: The United States of America as represented by the United States Department of Energy, Washington, D.C.

[21] Appl. No.: 494,484

[22] Filed: May 13, 1983
(Under 37 CFR 1.47)

Related U.S. Application Data

[63] Continuation-in-part of Ser. No. 318,080, Nov. 4, 1981, abandoned.

[51] Int. Cl.$^3$ ............................................... C08K 3/12
[52] U.S. Cl. ..................................... 523/505; 523/501
[58] Field of Search ................ 523/501, 505; 524/906, 524/5

[56] References Cited

U.S. PATENT DOCUMENTS

| 3,256,229 | 6/1966 | Janota et al. | 524/5 |
| 3,437,619 | 4/1969 | Nutt | 523/501 |
| 3,449,285 | 6/1969 | Jones et al. | 523/501 |
| 4,240,840 | 12/1980 | Downing et al. | 524/5 |
| 4,339,273 | 7/1982 | Meier et al. | 524/5 |
| 4,346,183 | 8/1982 | Hyde | 524/906 |

FOREIGN PATENT DOCUMENTS

| 220280 | 8/1957 | Australia | 523/505 |
| 48-32771 | 10/1973 | Japan | 523/501 |

OTHER PUBLICATIONS

Bauer; Plain Concrete; McGraw-Hill Book Co., Inc.; 1936; pp. 49, 67.
La Londe; Concrete Engineering Handbook; McGraw-Hill Book Co., Inc.; 1961; pp. 1-12, 1-20.

Primary Examiner—Lewis T. Jacobs
Attorney, Agent, or Firm—Margaret C. Bogosian; James W. Weinberger; Judson R. Hightower

[57] ABSTRACT

Quick setting polymer concrete compositions with excellent structural properties are disclosed; these polymer concrete compositions are mixtures of unsaturated polyesters and crosslinking monomers together with appropriate initiators and promoters in association with aggregate, which may be wet, and with a source of bivalent metallic ions.

6 Claims, No Drawings

ELECTROPOSITIVE BIVALENT METALLIC ION UNSATURATED POLYESTER COMPLEXED POLYMER CONCRETE

The U.S. Government has rights in this invention pursuant to Contract No. DE-AC02-76CHOOO16, between the U.S. Department of Energy and Associated Universities, Inc.

RELATED APPLICATIONS

This application is a Continuation-In-Part of co-pending U.S. patent application Ser. No. 318,080, filed Nov. 4, 1981, now abandoned.

BACKGROUND OF THE INVENTION

The present invention relates to quick setting polymer concrete compositions which will set to polymer concretes having high compressive strength. Some embodiments achieve compressive strengths in excess of 2000 psi within one hour after mixing. The polymer concrete compositions comprise unsaturated polyester compositions including a crosslinking monomer and a minor proportion of at least one promoter and initiator together with a source of bivalent metallic ions. The latter may be contained in an aggregate system or independent thereof.

A need exists for compositions suitable for the rapid repair of deteriorated portland cement concrete bridge decks and highways and for construction material for pipes, slabs, wall panels and the like. The need is particularly acute for compositions that can be used for the simple and rapid reapir, under all weather conditions, of damaged aircraft runways.

Materials currently receiving world wide attention for these needs are known as polymer concretes (PC) and generally comprise an aggregate system and a polymeric binder. To produce PC, the aggregate is normally mixed with a monomer or curable polymer formulation and subsequently cured in place.

PC can be made using a variety of polymeric materials such as epoxies, polyester, methyl metacrylate (MMA) and mixtures of MMA with other acrylics as crosslinking agents.

Aircraft runway repair, particularly under combat situations, imposes many criteria not normally met in the repair of ordinary commercial facilities. The repair must be simple, rapid and produce a patch capable of standing up under stress of use by heavy, high speed aircraft. The repair systems must be capable of use under all weather conditions including a wide range of temperatures, e.g. −5° C. to 40° C. and all forms of precipitation. Specifically, the rapid curing compositions should be compatible with water, curable in less than an hour over a temperature range from −5° C. to 40° C. to a product with compressive strength of more than 2000 psi, a flexural strength greater than 500 psi, and a bond strength greater than 200 psi. Additionally, the system should be low cost, stable over long periods of time under all weather conditions, nontoxic, and nonflammable or at least flame resistant.

Ester types of unsaturated polyester concrete (UP-PC) comprising UP-styrene compositions and dry aggregate are currently being widely employed as rapid repair materials for portland cement concrete (PCC) structures. These materials cannot be used under conditions of high humidity or with wet aggregate because rapid hydrolysis of the ester groups leads to the production of PC patches with very low strengths. For example, the compressive strength of UP-PC containing wet aggregate (8% water content) was found to be zero at the end of one hour and only 830 psi at the end of 24 hours.

SUMMARY OF THE INVENTION

A principal object of the present invention is to solve the disadvantages of existing PC systems, particularly existing UP-PC systems by providing quick setting, water compatible UP-PC compositions with high compressive strength, e.g. at least 1000 psi.

Another object is to provide UP-PC compositions capable of achieving compressive strengths in excess of 2000 psi within one hour after mixing over a temperature range of from −5° C. to 40° C.

Still another object is to provide UP-PC compositions of improved fire resistance.

Another object is to provide rapid repair compositions for deteriorated asphalt and concrete runways, roadways, bridges and the like.

Additional objects, advantages and novel features of the invention will be set forth in part in the description that follows.

The objects of the invention are achieved by providing quick setting, water compatible UP-PC compositions containing unsaturated polyester, a crosslinking monomer such as styrene, a suitable initiator for the curing of the polyester and crosslinking monomer, a promoter for the polymerization reaction, an aggregate system, water and a material which will release bivalent metallic ions into aqueous solution. By suitable selection of the components and the relative amounts thereof, compositions can be provided which will set within one hour to a PC with a compressive strength of more than 2000 psi. These compositions are especially useful for rapid repair of runways or other structures. Other embodiments of the invention, while generally setting to a non-flowable gel within one hour, will not achieve such a high compressive strength within this short period of time. These latter embodiments, as well as the rapid setting compositions, are useful for ordinary repairs where the requirements are not as stringent as in the repair of aircraft runways under combat conditions. Compositions within the scope of this invention are capable of setting to PC with compressive strengths as high as 4000 psi and even higher over a 24 hour period.

Unsaturated polyesters are a well known, commercially available class of polymers prepared by reaction between unsaturated acids or anhydrides and polyols, usually alkylene diols or triols. They may be modified by a crosslinking reaction with an unsaturated monomer. Typical acids or anhydrides utilized for the preparation of the products include maleic, fumaric, chloromaleic and chlorofumaric acids and anhydrides. Typical polyols include ethylene and propylene glycol, diethylene glycol, 2,2-dimethylpropane-1,3-diol and glycerol. Crosslinking monomers commonly employed are vinyl monomers including styrene, vinyl toluene, divinyl benzene, acrylic and methacrylic esters, diallyl phthalate and triallyl cyanurate.

The polyesters may be formed with modifying acid or anhydride monomers such as phthalic, isophthalic, adipic or sebacic anhydrides or acids. These are employed to control the number of unsaturated reactive sites which will crosslink in the presence of the crosslinking vinyl monomer.

The unsaturated esters are typically provided in solution in the selected crosslinking monomer and the solution may contain a promoter for the reaction between the polyester and the monomer. Useful promoters are well known. They include, for example, cobalt naphthenate and tertiary dialkyl aryl amines such as diethyl aniline.

The chemistry of unsaturated polyesters and modified unsaturated polyesters is well known and need not be discussed in detail for a complete understanding of this invention.

Any of a wide variety of commercially available products can be employed in the invention. The most popular chemical products are styrene solutions of polyesters which are prepared from maleic acid or anhydride and propylene glycol or glycerol utilizing a phthalic acid or anhydride such as isophthalic acid to control the degree of unsaturation. These products are suitable for use in this invention. Useful products are available from Arrow Chemicals Corp., the Patco Division of W. R. Grace, Inc. and from others.

One particularly useful product is available from Patco as LB 183-13. It is understood to be a polyester of propylene glycol, maleic acid and phthalic acid dissolved in styrene. For use in this invention, it normally contains sufficient styrene so that the resulting polyester composition contains from 30% to 60% styrene by weight based on the weight of the polyester composition. The viscosity of the diluted product is from about 100 to 300 cp.

The polyester compositions will contain a minor amount, i.e. from about 0.02% to 5%, of a promoter or mixtures of promoters.

The crosslinking or curing of the polyester composition is effected by the use of a free radical initiator. A wide variety of initiators are known. These include peroxides such as acetyl peroxide, benzoyl peroxide or methyl ethyl ketone peroxide. Such initiators or catalysts are used in minor proportions not usually exceeding 5% by weight.

As a general rule, the compositions which set most rapidly to products with compressive strengths in excess of 2000 psi will contain relatively high amounts of promoters and catalysts, but still below the above-mentioned values.

For use in the practice of this invention, sufficient unsaturated polymer compositions will be employed to produce PC compositions containing from 8% to 20% by weight of polyester composition based on the total weight of the PC composition. In turn, the unsaturated polyester composition will contain, based on its own total weight, from 30% to 60% of a crosslinking monomer such as styrene.

The aggregate system employed in this invention is preferably a mixture of silica sands which may be fine or coarse. If only fine sands are utilized, the product is generally referred to as a mortar. If coarse sands, or a mixture of fine and coarse sands are employed, the product is generally referred to as a concrete. For convenience in the description and claims hereof, all products are referred to as concretes. Limestone or other crushed stone may also be utilized as the aggregate or as a component of the aggregate together with silica sand.

For use in the formulations of this invention, the particle size of the coarse aggregate may be from 2.4 mm to 9.5 mm and the fine aggregate, from 0.149 mm to 1.19 mm. The mix may also contain a small amount of silica flour filler with a particle size under 60 um. When a course aggregate is used, the preferred ratio of fine aggregate to coarse aggregate is from 3:2 to 1:1.

As indicated above, a particular advantage of the compositions of this invention is that they can be mixed in the presence of water without loss of compressive strength or other desirable attributes of polymer concretes. The amount of water in the PC composition may vary from 0.75% to 10% by weight based on the total weight of the composition. The water may be originally present as a portion of the aggregate, for example, absorbed rain water, or water by hydration. It may be frozen. In that event, the balance of the water will be added at the time of forming the PC. Alternatively, all of the water may be added at the time when all of the components of the composition are mixed to form the PC. This latter procedure is especially advantageous when the components of the PC compositions are packaged for shipment. In this event, it is preferred to ship the aggregate with as little associated water as possible to save shipping costs.

The last of the principal components in the composition of this invention is a source of bivalent metallic ions such as calcium, magnesium, manganese, zinc, cadmium or barium. The source should be one which will release the ions into solution in an aqueous media, specifically the aqueous system comprising the PC formulations of this invention. Any of a wide variety of materials can be used to provide the requisite bivalent metallic ions. These include metallic oxides and salts which are at least partially soluble in water such as calcium sulfate, calcium oxide, calcium chloride, magnesium oxide, zinc oxide, zinc chloride, barium chloride, and barium oxide. The material containing the ion source need not be absolutely pure. In fact, it may contain a large proportion of other ingredients provided that these do not deleteriously influence the reaction. The material should, however, contain the bivalent metallic ion source as the major ingredient. Gypsum and calcium sulfate are excellent sources of calcium ions, which is the preferred bivalent metallic ion.

A most preferred source of bivalent metallic ions is portland cement. It is preferred because it provides calcium ions, is readily available, easy to use, inexpensive and to the extent that it is used, functions in part as a reactive aggregate.

Portland cement is a well known material. Typically, it will contain:

| | |
| --- | --- |
| $SiO_2$ | 19–24% |
| $Al_2O_3$ | 6–7.5% |
| $Fe_2O_3$ | 2–2.5% |
| CaO | 55–65% |
| MgO | 3–5% |
| $SO_3$ | 2–3% | along with other minor constituents.

If portland cement is used as the source of bivalent metallic ions, the amount employed will be from 10% to 20% by weight based on the total weight of the composition. If the source of bivalent metallic ions is pure or relatively pure, a lesser amount, say 5% to 10% by weight, will be utilized.

To summarize the above, the quick setting, water compatible PC compositions of this invention contain the following components in the stated amounts based on the total weight of the composition:

1. from 8% to 10% by weight of an unsaturated polyester composition containing from 30% to 60% by weight based on the total weight of the polyester composition of a crosslinking monomer, preferably styrene, together with a minor amount of a promoter such as cobalt naphthenate, dimethyl aniline or mixtures thereof;

2. a minor amount of an initiator for the curing of the polyester and the crosslinking monomer such as benzoyl peroxide or methyl ethyl ketone peroxide;
3. from 60% to 80% of an aggregate system which may or may not contain water, will contain fine particles and may contain coarse particles, the ratio of fine to coarse particles (if present) being from 3:2 to 1:1;
4. from 0.75% to 10% water, and
5. the balance, preferably portland cement, or another material which will release calcium or other bivalent metallic ions into an aqueous system.

While the invention is not limited in any way by theory, it is believed that the bivalent metallic ions react with terminal carboxyl groups on the polyester thereby preventing degradation of the polymer chain. The carboxyl groups arise from hydrolysis of the original ester groups in the aqueous system. At the same time, the crosslinking monomer reacts to join together neighboring polymer chains. The result of these two reactions is a strong, rigid three dimensional polymer structure which firmly bonds the aggregate and forms a strong attachment to the cement adjacent to the patch so that the patch has excellent structural properties and is held firmly in place.

The tensile and flexural strength of the PC compositions can be increased by including in the formulations reinforcing fillers such as fibrous materials, particularly steel or glass fibers. Best results are obtained when the amount of such fillers is from 3% to 8% by weight based on the weight of the aggregate.

In one particular embodiment of the present invention, randomly oriented steel fiber is included in the polymer concrete composition to increase the tensile and flexural strengths. Preferably the steel fiber is present at a concentration of about 5 weight percent, by weight of the aggregate.

The compositions of this invention can be provided in a variety of different modes. Thus, each component can be separately packaged and mixed at the site. Alternatively, the aggregate and source of bivalent metallic ions can be packaged and mixed with the polymer and water at the site. The initiator will, of course, always be packaged separately from the polyester. The unsaturated polyester, vinyl crosslinking monomer and promoter will normally be packaged together.

To deal with relatively small patches, it will be convenient to provide all the components as separate units in one package. Thus, a package can be provided, one unit of which contains the selected unsaturated polyester polymer composition including from 30% to 60% by weight based on the weight of the polymer composition of a crosslinking monomer together with a minor proportion of the selected promoter. The initiator will be a separate unit in the package. The aggregate system which may contain up to about 10% by weight of water based on the total weight of the polymer concrete composition will be a third unit in the package. The fourth unit will contain the source of bivalent metallic ions, e.g. portland cement. Of course, the aggregate and the source of bivalent metallic ions may be combined so that the resulting package will contain only three units, and this would be considered the equivalent of the four unit package.

One convenient method for preparing PC from the PC compositions of this invention is to mix the aggregate component with the component which is the source of the bivalent metallic ion to form an aggregate combination. The initiator component and the unsaturated polyester component are separately mixed to form a polymer combination. The separate combinations are then mixed and the resulting combination allowed to cure or set to form the PC. In some instances, it will be convenient to mix the two combinations and fill the resulting composition into the patch to be repaired. For the repair of smaller patches, it will normally be best to mix the two combinations separately, fill the patch with the resulting mix, and allow it to cure in the patch.

EXAMPLE 1

Polymer concrete compositions were prepared with ingredients as listed in Table 1 in which PC is polymer concrete, UP is unsaturated polyester, St is styrene, CoN is cobalt naphthenate, DMA is dimethyl aniline and MEKP is methyl ethyl ketone peroxide.

The water, cement and aggregate were thoroughly mixed, the catalyst was added to the UP-St containing the two promoters and the two mixtures were combined and allowed to set.

EXAMPLE 2

The compressive strengths for various polymer concretes prepared according to the parameters of Example 1, under the temperature conditions and with varying amounts of components shown in Table 2, were determined according to ASTM C-39. Test cylinders 3.25 inches in diameter $\times$ 5.5 inches long (8.25 $\times$ 14 cm) were used. The ends of the specimens were ground rather than capped with sulfur since in many cases the strength of the polymer concrete exceeded the strength of the capping compound. When ground, it was required that the ends not depart from a plane by more than 0.002 inches (0.005 cm). The test results are shown in Table 2.

TABLE 1

| | | | | | | | |
|---|---|---|---|---|---|---|---|
| | | | Ca—UP Complexed PC Compositions | | | | |
| Specimen No. | UP—St monomer, wt % | Aggregate[a], wt % | Portland cement filler, wt % | MEKP initiator wt %, by weight of UP—St monomer | CoN promoter, wt % by weight of UP—St monomer | DMA promoter, wt: by weight of UP—St monomer | Water, wt % by weight of aggregate |
| F | 20.0 | 70.0 | 10.0 | 2 to 4 | 2 | 1 to 2 | 7.5 |
| G | 24.3 | 63.5 | 12.2 | 2 to 4 | 2 | 1 to 2 | 5.0 |
| H | 26.3 | 60.5 | 13.2 | 2 to 4 | 2 | 1 to 2 | 2.5 |

[a]Aggregate, 50 wt % No. 16 sand (size, 1.19 mm) - 25 wt % No. 30 sand (size, 0.595 mm) - 25 wt % No. 100 sand (size, 0.149 mm).

TABLE 2

Compressive Strength of Ca—UP PC as a Function of Age for the Temperature Range 30° to 20° C.

| Specimen No. | Mixing Temperature C.° | Storage Temperature C.° | Water wt % | MEKP initiator wt % | CoN promoter wt % | DMA promoter wt % | Compressive strength, psi | | |
|---|---|---|---|---|---|---|---|---|---|
| | | | | | | | 1 hr | 5 hr | 24 hr |
| F-1 | 30 | 24 | 7.5 | 2 | 2 | 1 | 1955 | 3226 | 3952 |
| F-2 | " | " | " | 2 | 2 | 2 | 2174 | 3665 | 4229 |
| F-3 | " | " | " | 4 | 2 | 2 | 1806 | 2823 | 3145 |
| G-1 | " | " | 5.0 | 2 | 2 | 1 | 2823 | 3468 | 4313 |
| G-2 | " | " | " | 2 | 2 | 2 | 2903 | 3710 | 5116 |
| G-3 | " | " | " | 4 | 2 | 2 | 2258 | 3226 | 4274 |
| H-1 | " | " | 2.5 | 2 | 2 | 1 | 3883 | 4113 | 5019 |
| H-2 | " | " | " | 2 | 2 | 2 | 4083 | 4435 | 5323 |
| H-3 | " | " | " | 4 | 2 | 2 | 3306 | 3710 | 4355 |
| F-4 | 20 | 20 | 7.5 | 2 | 2 | 1 | 1223 | 1984 | 2161 |
| F-5 | " | " | " | 2 | 2 | 2 | 1860 | 2258 | 2906 |
| F-6 | " | " | " | 4 | 2 | 2 | 1057 | 1466 | 1825 |
| G-4 | " | " | 5.0 | 2 | 2 | 1 | 1824 | 2984 | 4161 |
| G-5 | " | " | " | 2 | 2 | 2 | 2145 | 3145 | 4919 |
| G-6 | " | " | " | 4 | 2 | 2 | 1481 | 2742 | 3861 |

EXAMPLE 3

Polymer concrete compositions according to the present invention, containing lower water content, were prepared as listed in Table 3.

EXAMPLE 4

Polymer concrete compositions according to the present invention, containing fiber reinforcement, were prepared as follows:

| UP-St monomer, wt % | Course aggregate, wt % | | | Water, by weight of aggregate, wt %[d] | Type III portland cement, wt % | Fiber, by weight of aggregate, |
|---|---|---|---|---|---|---|
| | L.C.A.[a] | M.C.A.[b] | S.C.A.[c] | | | |
| 18 | 47.0 | 18.8 | 12.5 | 0.9 | 3.7 | 5.0 |

COMPOSITION OF FIBER-REINFORCED CA-UP PC PREPARED BY USING TAMPING-PONDING TECHNOLOGY AT 45° and 30° C.

[a]Large coarse aggregate (50.0 to 25.0 mm).
[b]Medium coarse aggregate (18.8 to 6.3 mm).
[c]Small coarse aggregate (12.5 to 2.38 mm).
[d]Maximum water content.

EXAMPLE 5

The compressive strengths and gel times of polymer concrete compositions prepared as described in Example 3 are shown in Table 4. Measurements of gel time were preformed by inserting a thermocouple which was connected to a strip chart recorder into a test tube containing a 150 g mass of the PC. During polymerization, the temperature was monitored in the recorder.

Note that the one hour strength increases with increasing levels of DMA and the gel time decreases. The compressive strength of all of these compositions increases significantly with the passage of time.

The polymer concretes of this invention in addition to high compressive strength, especially after aging, also manifest high flexure, tensile and shear strength. In addition, they are resistant to chemicals, stand up well under temperature extremes, are stable in boiling water and self extinguishing when exposed to flame. A special advantage of the compositions of this invention is that they will set to polymer concretes with good structural properties under water.

TABLE 3

Compositions of Ca—UP PC Polymerized at 30° C.

| Specimen No. | monomer, wt % | Aggregate[a], wt % | Type III portland cement, filler wt % | MEKP initiator % by weight of UP-St monomer | CoN promoter, % by weight of UP-St monomer | DMA promoter % by weight of UP-St monomer | Water, % by weight of aggregate |
|---|---|---|---|---|---|---|---|
| U-A | 19.0 | 70.9 | 10.1 | 0.5 to 2.0 | 1.0 to 2.0 | 0.2 to 1.0 | 3.5 |
| U-B | 19.0 | 70.9 | 10.1 | 1.0 | 2.0 | 0.2 to 1.0 | 2.5 |
| U-C | 20.0 | 70.0 | 10.0 | 1.0 | 1.5 | 0 to 1.0 | 1.5 |
| U-D | 20.0 | 70.0 | 10.0 | 1.0 | 1.5 | 0 to 0.5 | 0.75 |

[a]Aggregate, 60 wt % coarse (size, 9.5 to 2.38 mm) - 40 wt % fine (size, 1.19 to 0.149 mm).

TABLE 4

Compressive Strength of Ca—UP PC as a function of Age Cured at 30° C.

| Specimen No. | Temperature, °C. | | Water wt % | MEKP initiator wt % | CoN promoter wt % | DMA promoter wt % | Gel time, min:sec | 1-hr compressive strength, psi |
|---|---|---|---|---|---|---|---|---|
| | Mixing | Storage | | | | | | |
| U-A-1 | 30 | 24 | 3.5 | 0.5 | 2.0 | 0.0 | 17:30 | 377 |
| U-A-2 | 30 | 24 | 3.5 | 1.0 | 1.0 | 0.0 | 9:25 | 725 |

TABLE 4-continued

Compressive Strength of Ca—UP PC as a function of Age Cured at 30° C.

| Specimen No. | Temperature, °C. Mixing | Temperature, °C. Storage | Water wt % | MEKP initiator wt % | CoN promoter wt % | DMA promoter wt % | Gel time, min:sec | 1-hr compressive strength, psi |
|---|---|---|---|---|---|---|---|---|
| U-A-3 | 30 | 24 | 3.5 | 1.0 | 2.0 | 0.0 | 4:10 | 1,508 |
| U-A-4 | 30 | 24 | 3.5 | 1.0 | 2.0 | 0.2 | 3:30 | 2,432 |
| U-A-5 | 30 | 24 | 3.5 | 1.0 | 2.0 | 0.5 | 2:15 | 2,774 |
| U-A-6 | 30 | 24 | 3.5 | 1.5 | 2.0 | 0.0 | 3:35 | 1,873 |
| U-A-7 | 30 | 24 | 3.5 | 2.0 | 2.0 | 0.0 | 2:40 | 1,988 |
| U-A-8 | 30 | 24 | 3.5 | 2.0 | 2.0 | 0.2 | 2:15 | 2,634 |
| U-A-9 | 30 | 24 | 3.5 | 2.0 | 2.0 | 0.5 | 1:45 | 3,220 |
| U-A-10 | 30 | 24 | 3.5 | 2.0 | 2.0 | 1.0 | 1:20 | 3,848 |
| U-B-1 | 30 | 24 | 2.5 | 1.0 | 2.0 | 0.0 | 4:50 | 917 |
| U-B-2 | 30 | 24 | 2.5 | 1.0 | 2.0 | 0.1 | 4:00 | 2,297 |
| U-B-3 | 30 | 24 | 2.5 | 1.0 | 2.0 | 0.2 | 3:20 | 2,376 |
| U-B-4 | 30 | 24 | 2.5 | 1.0 | 2.0 | 0.5 | 3:00 | 2,731 |
| U-B-5 | 30 | 24 | 2.5 | 1.0 | 2.0 | 1.0 | 2:25 | 2,800 |
| U-C-1 | 30 | 24 | 1.5 | 1.0 | 1.5 | 0.0 | 5:15 | 1,529 |
| U-C-2 | 30 | 24 | 1.5 | 1.0 | 1.5 | 0.1 | 3:50 | 2,255 |
| U-C-3 | 30 | 24 | 1.5 | 1.0 | 1.5 | 0.2 | 3:05 | 2,404 |
| U-C-4 | 30 | 24 | 1.5 | 1.0 | 1.5 | 0.5 | 2:10 | 2,994 |
| U-C-5 | 30 | 24 | 1.5 | 1.0 | 1.5 | 1.0 | 1:40 | 3,691 |
| U-D-1 | 30 | 24 | 0.75 | 1.0 | 1.5 | 0.0 | 5:40 | 1,869 |
| U-D-2 | 30 | 24 | 0.75 | 1.0 | 1.5 | 0.1 | 5:00 | 2,255 |
| U-D-3 | 30 | 24 | 0.75 | 1.0 | 1.5 | 0.3 | 4:30 | 2,411 |
| U-D-4 | 30 | 24 | 0.75 | 1.0 | 1.5 | 0.5 | 1:20 | 3,293 |

EXAMPLE 6

The mechanical properties and fracture characteristics of fiber-reinforced Ca-UP PC specimens were measured. Data obtained include single fiber pull-out strengths and flexural and splitting tensile strengths.

1. Single-Fiber Pull-Out Strength

In an attempt to provide an estimate of the hooked steel fiber - PC matrix interfacial bond strength, single fiber pull-out tests were performed. Ca-UP PC specimens with approximately 50 percent of the length of a fiber embedded in a polymer mortar sample 20 millimeters wide by 50 millimeters long by 5 millimeters thick (0.08 inches wide by 0.2 inches long by 0.02 inches thick) were used. Tests were performed at an ambient temperature of approximately 24° C. (75° F.).

Specimens of the Ca-UP mortar consisting of 26 weight percent UP-St monomer, 63 weight percent silica sand (size 1.19 to 0.149 millimeters), with a 7.5 weight percent water content, and an 11 weight percent reactive cement filler were also tested. The polymerization was initiated using 2.0 percent MEKP catalyst by weight of monomer in conjunction with 2.0 weight percent CoN and 0.5 weight percent DMA promoter. The 1-hour-compressive strength for the mortar speciments was approximately 3600 pounds per square inch (24.80 megapascals).

The test results from the pull-out measurements showed increased strength for the fiber-reinforced PC. Values ranged from an average of 620 pounds per square inch (4.27 megapascals) at an age of 1 hour to 1060 pounds per square inch (7.30 megapascals) at 22 hours.

2. Flexural and Splitting Tensile Strength

The results from flexural and splitting tensile strength measurements for 5 percent steel fiber-reinforced Ca-UP PC prepared by tamping-ponding technology indicate that the flexural and tensile strengths of Ca-UP PC specimens increased rapidly with time, up to approximately 7 hours. Samples without fiber had an average flexural strength at age 1 hour of 530 pounds per square inch (3.65 megapascals), slightly above the 500 pounds per square inch (3.45 megapascals) design requirement. Specimens containing 5 percent steel fiber had an average 1-hour flexural strength of 860 pounds per square inch (5.93 megapascals). The maximum strength at a cure time of 7 hours was 990 pounds per square inch (6.82 megapascals), approximately 20 percent greater than the unreinforced specimens.

The 1-hour tensile strength of Ca-UP averaged 380 pounds per square inch (2.62 megapascals) for the controls and 600 pounds per square inch (4.13 megapascals) for the reinforced specimens. The tensile strength of the fiber-reinforced PC composites reached a maximum value of 715 pounds per square inch (4.95 megapascals), approximately 40 percent higher than that of the control specimens.

We claim:

1. A water compatible polymer concrete composition which will achieve compressive strengths greater than 2000 psi within one hour after mixing over a temperature range of from −5° C. to 40° C. comprising based on the total weight of the composition, the following components:
   (a) from 8% to 20% of a polyester composition which contains an unsaturated polyester, from 30% to 60% by weight, based on the total weight of the polyester composition, of a vinyl crosslinking monomer, and from 0.02% to 5.0% by weight, based on the total weight of the polyester composition, of a promoter selected from the group consisting of cobalt napthenate, dimethyl aniline, mixtures thereof,
   (b) a minor proportion, up to 5% by weight, of a free-radical initiator for curing the polyester and the crosslinking monomer,
   (c) from 60% to 80% of an aggregate system composed of silica sands or silica sands mixed with limestone and/or crushed stone,
   (d) from 0.75% to 10% water, and
   (e) the balance Portland cement which will release calcium ions into an aqueous system,
said composition polymerizing to produce a polymer concrete.

2. A composition as in claim 1, wherein the vinyl crosslinking monomer is styrene.

3. A composition as in claim 1, wherein the aggregate system is a mixture of fine silica sand particles of a particle size from 0.149 mm to 1.19 mm and coarse silica sand, limestone or mixtures thereof of a particle size from 2.4 mm to 9.5 mm, the ratio of fine particles to coarse particles being from 3:2 to 1:1.

4. A composition as in claim 1, wherein the aggregate system is a mixture of silica sands having a particle size of from 0.149 to 1.19 mm.

5. A composition as in claim 1, wherein the aggregate system contains from 3% to 8% by weight, based on the weight of the aggregate, of a reinforcing fiber filler.

6. A composition as in claim 5, wherein the reinforcing fiber filler is steel fiber.

* * * * *